US010903933B2

(12) United States Patent
Skertic et al.

(10) Patent No.: US 10,903,933 B2
(45) Date of Patent: Jan. 26, 2021

(54) METHOD AND APPARATUS FOR CYBER SECURITY USING LIGHT POLARIZATION

(71) Applicants: Rolls-Royce North American Technologies Inc., Indianapolis, IN (US); Rolls-Royce Corporation, Indianapolis, IN (US)

(72) Inventors: Richard Joseph Skertic, Carmel, IN (US); John Joseph Costello, Indianapolis, IN (US)

(73) Assignees: ROLLS-ROYCE NORTH AMERICAN TECHNOLOGIES INC., Indianapolis, IN (US); ROLLS-ROYCE CORPORATION, Indianapolis, IN (US)

( * ) Notice: Subject to any disclaimer, the term of this patent is extended or adjusted under 35 U.S.C. 154(b) by 258 days.

(21) Appl. No.: 16/040,923

(22) Filed: Jul. 20, 2018

(65) Prior Publication Data

US 2019/0199465 A1 Jun. 27, 2019

Related U.S. Application Data

(60) Provisional application No. 62/609,092, filed on Dec. 21, 2017.

(51) Int. Cl.
*H04L 29/06* (2006.01)
*H04J 14/06* (2006.01)
(Continued)

(52) U.S. Cl.
CPC .............. *H04J 14/06* (2013.01); *H04B 10/70* (2013.01); *H04B 10/85* (2013.01); *H04L 9/0858* (2013.01); *H04L 63/145* (2013.01)

(58) Field of Classification Search
CPC ......... H04J 14/06; H04B 10/70; H04B 10/85; H04L 9/0858; H04L 9/0861; H04L 9/0869; H04L 63/145
See application file for complete search history.

(56) References Cited

U.S. PATENT DOCUMENTS 7,333,611 B1    2/2008  Yuen et al.
7,849,121 B2 *  12/2010 Fiorentino ............. B82Y 10/00
                                                            708/255
(Continued)

FOREIGN PATENT DOCUMENTS

WO     WO 2010/044709 A2    4/2010

OTHER PUBLICATIONS

"Electrically Driven Polarization Controller-Scrambler," dated Oct. 25, 2016, pp. 1-4, Published by Oz Optics Ltd., Ottawa, ON, Canada.

(Continued)

*Primary Examiner* — Hosuk Song
(74) *Attorney, Agent, or Firm* — Brinks Gilson & Lione

(57) ABSTRACT

Systems and methods are provided for cyber security using light polarization. Data may be encoded in an optical signal. A seed may be converted to a target degree of polarization. The optical signal may be polarized to have the target degree of polarization and transmitted. The polarized optical signal may be received at a receiver and a degree of polarization of the received polarized optical signal measured. A seed may be converted by the receiver to an expected degree of polarization. The received polarized optical signal may be determined to be compromised based on a difference between the expected degree of polarization and the degree of polarization of the received polarized optical signal.

15 Claims, 2 Drawing Sheets

(51) Int. Cl.
  *H04B 10/70* (2013.01)
  *H04B 10/85* (2013.01)
  *H04L 9/08* (2006.01)

(56) References Cited

U.S. PATENT DOCUMENTS

| | | | |
|---|---|---|---|
| 7,903,977 B2* | 3/2011 | MacDonald | H04B 10/85 398/152 |
| 8,538,272 B1* | 9/2013 | Robinson | H04B 10/2513 398/158 |
| 9,246,680 B2* | 1/2016 | Verma | H04L 9/0852 |
| 9,735,955 B2* | 8/2017 | Verma | H04L 9/0852 |
| 9,866,379 B2* | 1/2018 | Nordholt | H04L 9/0858 |
| 2006/0072922 A1 | 4/2006 | MacDonald et al. | |
| 2008/0298583 A1 | 12/2008 | Ahmed | |

OTHER PUBLICATIONS

"Stokes Parameters," dated Nov. 9, 2017, pp. 1-9, published online by Wikipedia.org.

European Search Report, issued in European Patent Application No. 18209115, dated May 17, 2019, pp. 1-8, European Patent Office, Munich, Germany.

Mats Sköld et al., "Low-Cost Multiparameter Optical Performance Monitoring Based on Polarization Modulation," Journal of Lightwave Technology, ISSN 15582213, dated Feb. 13, 2009, pp. 128-138, vol. 27, No. 2, published online by IEEE at URL http://doi.org/10.1109/JLT.2008.929116.

* cited by examiner

METHOD AND APPARATUS FOR CYBER SECURITY USING LIGHT POLARIZATION

CROSS-REFERENCE TO RELATED APPLICATIONS

This application is a non-provisional application of, and claims priority under 35 USC § 120 to, U.S. provisional/non-provisional application 62/609,092, filed Dec. 21, 2017, the entire contents of which are incorporated by reference.

TECHNICAL FIELD

This disclosure relates to cyber security and, in particular, to cyber security in optical signals.

BACKGROUND

All typical communication networks have some level of vulnerability to cyberattack. Traditional wiring harnesses using copper wiring, fiber optic, and wireless communication networks are all susceptible to external threats.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

One interesting feature of the systems and methods described below may be that a cyberattack on an optical signal may be detected in while the cyberattack is in process. Alternatively or in addition, an interesting feature of the systems and methods described below may be that a cyberattack that involves inserting a compromised data packet may be detected if the degree of polarization is incorrect in the optical signal in which the data packet is encoded.

Figure 1:
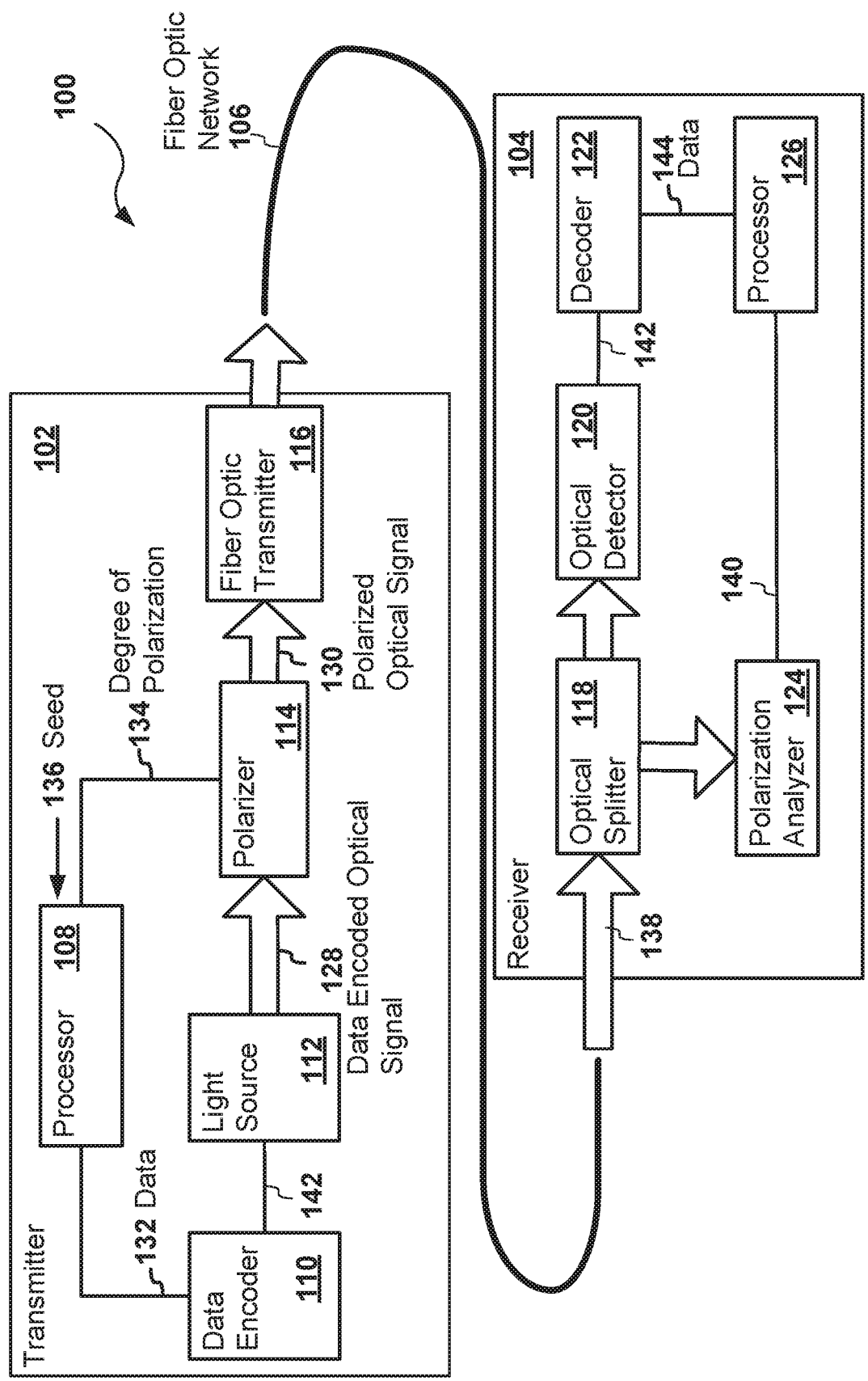
FIG. 1 illustrates an example of a system for cyber security using light polarization.

FIG. 1 illustrates an example of a system 100 for cyber security using light polarization. The system 100 includes a transmitter 102 and a receiver 104 connected by a fiber optic network 106. The transmitter 102 includes a processor 108, a data encoder 110, a light source 112, a polarizer 114, and a fiber optic transmitter 116. The receiver 104 includes an optical splitter 118, an optical detector 120, a decoder 122, a polarization analyzer 124, and a processor 126.

During operation of the system 100, the transmitter 102 may transmit data 132 as one or more data packets over the fiber optic network 106 to the receiver 104. The system 100 may use programmable light polarization and a seed 136 to provide data validation and encryption.

The seed 136 may be a number or a value from which an encryption key is obtained. The system 100 may obtain the encryption key by applying Function A to the seed 136. In some examples, Function A may be a random number generator and/or a pseudorandom number generator. The random number generator and/or the pseudorandom number generator may start with the seed 136. Alternatively or in addition, Function A may be may be any mathematical function that maps the seed 136 to the encryption key.

The system 100 may encrypt and decrypt the data 132 using the encryption key and an encryption algorithm. Examples of the encryption algorithm may include a symmetric-key encryption algorithm (for example DES or AES), a public-key encryption algorithm (for example RSA), and/or any other algorithm that transforms data into a format that cannot be easily reversed by unauthorized users.

The system 100 may convert the seed 136 to a degree of polarization 134 using any mathematical function. The degree of polarization 134 may be any representation that quantifies the degree of polarization in an optical signal. In a first example, the degree of polarization 134 may be an angle formed between a predetermined reference direction and the direction of polarization of the optical signal, where the predetermined reference direction and the direction of polarization are both are on a plane that is perpendicular to the direction that the optical signal is propagating. In a second example, the degree of polarization 134 may be a degree of polarization that is in the form of Stokes parameters. The Stokes parameters are a set of values that describe the polarization state of electromagnetic radiation. The Stokes parameters may be $S_0$, $S_1$, $S_2$, and $S_3$ in some examples. In alternative examples, the Stokes parameters may be I, Q, U, and V.

The polarizer 114 in the transmitter 102 may receive a data encoded optical signal 128 generated at the transmitter 102. The data encoded optical signal 128 is encoded with the data 132 to be transmitted to the receiver 104. The polarizer 114 polarizes the data encoded optical signal 128 according to the degree of polarization 134 and outputs a polarized optical signal 130. The transmitter 102 may transmit the polarized optical signal 130 to the receiver 104 over the fiber optic network 106.

The polarization analyzer 124 in the receiver 104 may receive an optical signal 138 that should match the polarized optical signal 130 transmitted by the transmitter 102. The polarization analyzer 124 may measure a degree of polarization 140 of the received optical signal 138. The receiver 104 may compare the received degree of polarization 140 with an expected degree of polarization. The receiver 104 may determine the expected degree of polarization from the seed 136, which the receiver 104 should already have in order to decrypt the data 132 that is encoded in the received optical signal 138. If the received degree of polarization 140 fails to match the expected degree of polarization, then the data encoded in the received optical signal 138 may have been sent by a hacker, read by an eavesdropper, or have been otherwise compromised.

As explained in more detail below, the seed 136 may change over time. As a result, the degree of polarization 134 of the polarized optical signal 130 may change over time.

Figure 2:
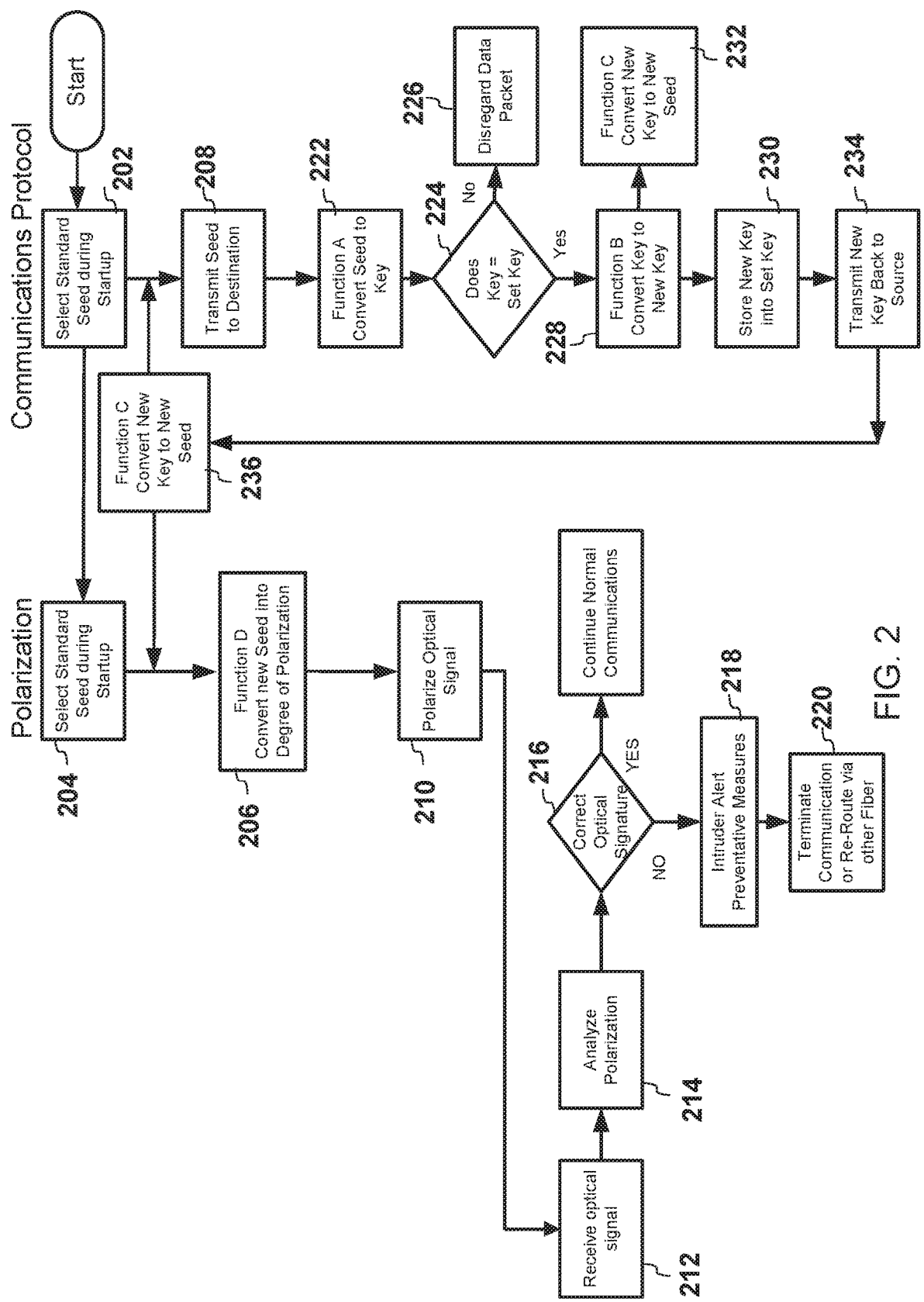
FIG. 2 illustrates a flow diagram of example logic of the system for cyber security using light polarization.

FIG. 2 illustrates a flow diagram of example logic of the system 100 for cyber security using light polarization. Operations related to polarization are shown on the left side of the flow diagram and operations related to communication of the data 132 are shown on the right side of the flow diagram.

Operations may start by selecting (202) a predetermined seed as the seed 136 for encryption of the communication and also selecting (204) the predetermined seed as the seed 136 for the polarization. For example, the predetermined seed may be stored in memory (not shown) of the transmitter 102 and the receiver 104, and when the transmitter 102 and the receiver 104 are powered on, the processor 108 of the transmitter 102 and the processor 104 of the receiver 104 may read the predetermined seed from their respective memories. In the example shown in FIG. 2, the seed used for encryption and decryption of the data 132 is the same seed used for the polarization. In other examples, the data 132 may not be encrypted (or decrypted) but the seed 136 may be communicated as shown in FIG. 2. For example, the data may be communicated in clear text.

After the seed 136 is selected (204), the seed 136 is converted (206) into the degree of polarization 134. For example, the processor 108 may convert the seed 136 into the degree of polarization 134 using Function D. For example, the seed 136 may be a four bit word and Function D maps each of the four bits into a corresponding one of the four Stokes parameters. In another example, the seed 136 may be a value that falls in a range from −M to +M, and Function D multiplies the seed 136 by $\pi/(2M)$ to arrive at a polarization angle, p, where $-\pi/2 \leq p \geq +\pi/2$.

The seed 136 is transmitted (208) from the transmitter 102 to the receiver 104 over the fiber optic network 106. For example, the processor 108 may provide the seed 136 to the data encoder 110 as the data 132. The data encoder 110 may encode the data 132 (the seed 136) into an electrical signal 142. The electrical signal 142 may control the light source 112 so as to generate the data encoded optical signal 128. The data encoded optical signal 128 may be polarized (210) by the polarizer 114 according to the degree of polarization 134 provided to the polarizer 114 by the processor 108. The fiber optic transmitter 116 may transmit the polarized optical signal 130, in which the seed 136 is encoded, over the fiber optic network 106 to the receiver 104.

The optical signal 138 is received (212) by the receiver 104. The optical splitter 118 in the receiver 104 may provide the received optical signal 138 to the polarization analyzer 124 and the optical detector 120. The optical detector 120 may convert the received optical signal 138 into an electronic signal 142. The decoder 122 may decode received data 144 from the electronic signal 142. In this example, the received data 144 may include the seed 136 transmitted by the transmitter 102. The processor 126 may receive the data 144 from the decoder 122.

The polarization of the received optical signal 138 is analyzed (214). For example, the polarization analyzer 124 may measure a degree of polarization 140 of the received optical signal 138. The processor 126 of the receiver 104 may receive the measured degree of polarization 140 from the polarization analyzer 124.

An optical signature of the received optical signal 138 is verified (216). The optical signature may be the received degree of polarization. To verify the optical signature, the processor 126 of the receiver 104 may compare the received degree of polarization 140 with an expected degree of polarization. The processor 126 may determine the expected degree of polarization from the seed, which the processor 126 may read from memory (not shown) of the receiver 104—initially, the seed in the memory of the receiver 104 may be the predetermined seed. To determine the expected degree of polarization, for example, the processor 126 may convert the seed read from memory to the expected degree of polarization using Function D.

If the received degree of polarization 140 matches the expected degree of polarization, then the received optical signature is correct and operation of the system 100 may continue as described in more detail below. Alternatively, if the received degree of polarization 140 fails to match the expected degree of polarization, then the received optical signature is incorrect.

If the received optical signature is incorrect, then the data encoded in the received optical signal 138 may have been compromised. In such a case, a corresponding action may be taken. For example, an intruder alert may be raised (218). The intruder alert may be a message displayed to a user and/or an auditory signal played to a user, for example. In some examples, the intruder alert may be a message sent internally within the receiver 104 or to another node in the fiber optic network 106. Alternatively or in addition, preventative measures may be taken. For example, the system 100 may terminate the communication between the transmitter 102 and the receiver 104. In some examples, the communication between the transmitter 102 and the receiver 104 may be re-routed over a different fiber in the fiber optic network 106 than the received optical signal 138 was received over.

Returning to the case where the optical signature is correct, the received data 144 generated by the decoder 122 may include the seed 136 transmitted from the transmitter 102.

The seed included in the data 144 received over the fiber optic network 106 is converted (222) to a generated encryption key using Function A. For example, the processor 126 may create the generated encryption key by performing Function A on the seed included in the data 144 received over the fiber optic network.

Next, the generated encryption key is compared (224) with a set key. The set key may be a previously determined key. For example, in response to powering on the receiver 104, the processor 126 may have generated the set key from the predetermined seed using Function A and stored the set key in memory (not shown) so the set key may be later compared with the encryption key generated from the data 144 received over the fiber optic network 106. The processor 126, for example, may compare the generated encryption key with the set key retrieved from memory.

If the generated encryption key fails to match the set key, then the data packet in the data 144 may be discarded (226) or ignored. For example, the processor 126 may wait to receive another data packet.

Alternatively, if the generated encryption key matches the set key, then a new encryption key may be generated (228) for a subsequent data packet. For the example, the processor 126 may convert the set key to the new encryption key by performing Function A on the set key. The new encryption key may be stored (230) as the set key in memory.

The new encryption key may be converted (232) into a new seed. For example, the processor 126 may convert the new encryption key to the new seed by applying Function C to the new encryption key. The new seed may be used to determine the expected degree of polarization in the optical signal in which a subsequent data packet is encoded.

The new encryption key may be transmitted (234) from the receiver 104 to the transmitter 104. Operations may end, for example, by converting (236) the new encryption key received at the transmitter 102 into the new seed at the transmitter 102 using Function C. Alternatively, instead of ending operations, operations may continue by repeating the above-described operations but starting with the new seed instead of the predetermined seed.

Transmitting the encryption key from the transmitter 102 to the receiver 104 and transmitting the new encryption key back to the transmitter 102 may act as a keep-alive communication that confirms the nodes (the transmitter 102 and the receiver 104) are functioning properly. Alternatively or in addition, this exchange of keys may act as a handshaking mechanism to keep the nodes synchronized.

The operations may be executed in a different order than illustrated in FIG. 2. The operations may include additional, different, or fewer operations than illustrated in FIG. 2. For example, the seed may not be transmitted (208) to the receiver 104. In such examples, the seed and subsequent changes to the seed may be handled independently at the transmitter 102 and receiver 104, respectively. Any known or later discovered mechanism for synchronizing the generation of the seeds and/or the encryption keys may be used.

For example, the new encryption key may not be transmitted from the receiver 104 to the transmitter 102. Instead, the transmitter 102 may convert the initial seed into a new encryption key using Function A In another example, the operations may not include terminating (220) communication and/or (220) re-routing communication between the transmitter 102 and 104 in response to a determination (216) that the optical signature of the received optical signal 138 is incorrect. Alternatively or in addition, the operations may not include raising (218) an intruder alert in response to a determination (216) that the optical signature of the received optical signal 138 is incorrect.

In yet another example, in response to a determination (216) that the optical signature of the received optical signal 138 is incorrect—instead of every time the generated encryption key matches the set key (224)—a new encryption key may be generated (228); the new encryption key may be stored (230) as the set key in memory; and the new encryption key may be transmitted (234) from the receiver 104 to the transmitter 104.

Function A, Function B, Function C, and Function D may be any mathematical map or mapping, which is either a function or a morphism in category theory, which generalizes the idea of a function. Function A, Function B, Function C, and Function D may be known to the transmitter 102 and/or the receiver 104, but are generally treated as "secret" so that a potential intruder does not know the specifics of Function A, Function B, Function C, and Function D. In some examples, the input to the mathematical map is the same as the output. In other examples, the output is different than the input. Each implementation of Function A, Function B, Function C, and Function D may be in a corresponding module, such as a Function A module, a Function B module, a Function C module, and a Function D module Function A is any mapping that converts or transforms a seed to an encryption key. In one example, Function A may be a mapping that changes a predetermined bit of the seed to arrive at the encryption key. In another example, Function A inverts all bits of the seed to arrive at the encryption key. In some examples, Function A may be a random number generator and/or a pseudorandom number generator. The random number generator and/or the pseudorandom number generator may start with the seed 136 and generate a next number in a sequence as the encryption key. Alternatively or in addition, Function A may be may be any mathematical function that maps the seed 136 to the encryption key.

The transmitter 102 may include an implementation of Function A in order to generate the encryption key from the seed 136 and then encrypt the data 132. Alternatively or in addition, the receiver 104 may include an implementation of Function A in order to generate the encryption key.

Function B is any mapping that converts an encryption key into a new key. One example of Function B is a pseudo random number generator that takes the encryption key as an input and generates a next value in a pseudo random sequence as the new key. Another example of Function B is a function that inverts all bits of the encryption key to arrive at the new key.

Function C is any mapping that converts an encryption key to a seed. One example of Function C includes a function that inverts all bits of the encryption key to arrive at the seed. Another example of Function C includes a pseudo random number generator that takes the encryption key as an input and generates a next value in a pseudo random sequence as the seed.

Function D is any mapping that converts a seed to a degree of polarization. In one example, Function D maps each of four portions of the seed into a corresponding one of the four Stokes parameters. In another example, the seed may be a value that falls in a range from zero to M, and Function D multiplies the difference between the seed and M/2 by $\pi/(M)$ to arrive at a polarization angle, p, where $-\pi/2 \leq p \geq +\pi/2$.

Referring to FIG. 1, the transmitter 102 and the receiver 104 may be transceivers in some examples. Accordingly, communication between the transceivers may be bidirectional in some examples.

Although the fiber optic network 106 illustrated in FIG. 1 may appear to include a single fiber, the network 106 may include one or more fibers. The fibers may be in a single optical cable or in multiple optical cables. The network 106 may include one or more additional components, such as repeaters and couplers. In alternative examples, the transmitter 102 and the receiver 104 may communicate with optical signals that travel in the line of sight instead of over the fiber optic network 106.

The processor 108 and 126 may be any device that performs logic operations. The processor 108 and 126 may be in communication with a memory. The processor 108 and 126 may also be in communication with additional components, such as a display. The processor 108 and 126 may include a general processor, a central processing unit, an application specific integrated circuit (ASIC), a digital signal processor, a field programmable gate array (FPGA), a digital circuit, an analog circuit, a microcontroller, a controller, and/or any other type of processor. In some examples, the processor 108 and 126 may include one or more elements operable to execute computer executable instructions or computer code embodied in memory.

The memory (not shown) may be any device for storing and retrieving data or any combination thereof. The memory may include non-volatile and/or volatile memory, such as a random access memory (RAM), a read-only memory (ROM), an erasable programmable read-only memory (EPROM), and/or flash memory. Alternatively or in addition, the memory may include an optical, magnetic (hard-drive) or any other form of data storage device.

The data encoder 110 may be any device that encodes data. In FIG. 1, the data encoder 110 is depicted as an encoder that encodes the data 132 into the electrical signal 142. However, in other examples, the encoder may be an optical encoder that receives an output from the light source 112, and then encodes the data 132 in the optical signal received from the light source 112. The data encoder 110 may encode the data 132 using frequency modulation, amplitude modulation, phase modulation, and/or any modulation mechanism.

Conversely, the decoder 122 may be any device decodes data. In FIG. 1, the decoder 110 is depicted as a decoder that decodes the data 144 from an electrical signal. However, in other examples, the decoder 122 may be an optical decoder that extracts the data from an optical signal. The decoder 122 may decode the data according to the manner in which the data 132 was encoded.

The light source 112 may be laser, a Light Emitting Diode (LED), or any other suitable light source 112. The fiber optic transmitter 116 may be any device that conveys the polarized optical signal 130 onto the fiber optic network 106. An example of the fiber optic transmitter 116 may include a fiber optic coupler. The fiber optic coupler may optically couple a waveguide in the transmitter 102 to an optical fiber. The fiber optic transmitter 116 may include one or more active and/or passive devices.

The optical detector 120 may be any device that may convert an optical signal to an electrical signal. In the example shown in FIG. 1, the optical detector 120 is configured to receive the optical signal from the optical splitter 118 and generate the electrical signal 142 that is received by the decoder 122.

The polarization analyzer 124 may be any device that can measure a degree of polarization of an optical signal. The polarization analyzer 124 may generate the Stokes parameters, an angle of polarization, and/or any other indication of the state of polarization of the optical signal.

The system 100 may be implemented with additional, different, or fewer components. For example, the system 100 may include only the transmitter 102. Alternatively, the system 100 may include only the receiver 104.

Each component may include additional, different, or fewer components. For example, the receiver 104 may additionally include the components shown in the transmitter 102 in some examples where the receiver 104 is a transceiver. In another example, the transmitter 102 may additionally include the components shown in the receiver 104 where the transmitter 102 is a transceiver.

The system 100 may be implemented in many different ways. Each module, such as the Function A module, the Function B module, the Function C module, and the Function D module, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of a memory, for example, that comprises instructions executable with the processor 108 or 126 or other processor to implement one or more of the features of the module. When any one of the module includes the portion of the memory that comprises instructions executable with the processor, the module may or may not include the processor. In some examples, each module may just be the portion of the memory that comprises instructions executable with the processor 108 or 126 or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action includes setting a Boolean variable to true and the second action is initiated if the Boolean variable is true.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A transmitter comprising:
   a processor configured to convert a seed into a degree of polarization;
   a polarizer configured to receive an optical signal in which a data packet is embedded, the polarizer further configured to polarize the optical signal at the degree of polarization; and
   a fiber optics transmitter configured to transmit the polarized optical signal over a fiber optic network.
2. The transmitter of aspect 1, wherein the seed is a number or a value from which an encryption key is obtainable.
3. The transmitter of any of aspects 1 to 2, wherein the seed is changed after each data packet is transmitted.
4. The transmitter of any of aspects 1 to 3 further comprising a decoder, wherein the processor is further configured to receive an encryption key via the decoder from the fiber optic network, and to generate a new seed from the encryption key.
5. The transmitter of any of aspects 1 to 4, wherein receipt of the encryption key indicates an intrusion was detected.
6. The transmitter of any of aspects 1 to 5, wherein the degree of polarization includes Stokes parameters.
7. The transmitter of any of aspects 1 to 5, wherein the degree of polarization includes an angle of polarization.
8. A receiver comprising:
   a polarization analyzer configured to receive an optical signal and measure a degree of polarization of the optical signal; and
   a processor configured to convert a seed into an expected degree of polarization and determine that the optical signal has been compromised if the degree of polarization of the optical signal fails to match the expected degree of polarization.
9. The receiver of aspect 8, wherein the seed is a number or a value from which an encryption key is obtainable.
10. The receiver of any of aspects 8 to 9, wherein the send is encoded in the optical signal.
11. The receiver of aspects 8 to 9, wherein the processor is configured to covert the seed into an encryption seed.
12. The receiver of aspect 11, wherein the processor is configured to convert the encryption seed into a new key and cause the new key to be transmitted over an optical fiber network to a node on the optical fiber network that transmitted the optical signal to the receiver.
13. The receiver of aspects 8 to 12, wherein the degree of polarization includes Stokes parameters.
14. The receiver of aspects 8 to 13, wherein the degree of polarization includes an angle of polarization.
15. A method comprising:
   encoding data in an optical signal;
   converting a seed to a target degree of polarization;
   polarizing the optical signal, which includes the encoded data, to have the target degree of polarization; and
   transmitting the polarized optical signal.
16. The method of aspect 15 further comprising:
   receiving the polarized optical signal;
   measuring a degree of polarization of the received polarized optical signal;
   converting a seed at a receiver to an expected degree of polarization; and
   determining that the received polarized optical signal is compromised based on a difference between the expected degree of polarization and the degree of polarization of the received polarized optical signal.
17. The method of aspect 16, further comprising changing the seed in response to the determination that the received polarized optical signal is compromised.
18. The method of any of aspects 16 to 17 further comprising ignoring the data encoded in the optical signal in response to the determination that the received polarized optical signal is compromised.
19. The method of any of aspects 16 to 18 further comprising generating an intruder alert in response to the determination that the received polarized optical signal is compromised.
20. The method of any of aspects 16 to 19 further comprising, in response to the determination that the received polarized optical signal is compromised, re-routing communication to an optical fiber that is different than an optical fiber over which the polarized optical signal was received.

What is claimed is:

1. A transmitter comprising:
   a processor configured to convert a seed into a degree of polarization;
   a polarizer configured to receive an optical signal in which a data packet is embedded, the polarizer further configured to polarize the optical signal at the degree of polarization;
   a fiber optics transmitter configured to transmit the polarized optical signal over a fiber optic network; and
   a decoder, wherein the processor is further configured to receive an encryption key via the decoder from the fiber optic network, and to generate a new seed from the encryption key.
2. The transmitter of claim 1, wherein the seed is a number or a value from which an encryption key is obtainable.
3. The transmitter of claim 1, wherein the seed is changed after each data packet is transmitted.
4. The transmitter of claim 1, wherein receipt of the encryption key indicates an intrusion was detected.
5. The transmitter of claim 1, wherein the degree of polarization includes Stokes parameters.
6. The transmitter of claim 1, wherein the degree of polarization includes an angle of polarization.
7. A receiver comprising:
   a polarization analyzer configured to receive an optical signal and measure a degree of polarization of the optical signal; and
   a processor configured to convert a seed into an expected degree of polarization and determine that the optical signal has been compromised if the degree of polarization of the optical signal fails to match the expected degree of polarization, wherein the processor is configured to covert the seed into an encryption seed and wherein the processor is configured to convert the encryption seed into a new key and cause the new key to be transmitted over an optical fiber network to a node on the optical fiber network that transmitted the optical signal to the receiver.

8. The receiver of claim 7, wherein the seed is a number or a value from which an encryption key is obtainable.

9. The receiver of claim 7, wherein the send is encoded in the optical signal.

10. The receiver of claim 7, wherein the degree of polarization includes Stokes parameters.

11. The receiver of claim 7, wherein the degree of polarization includes an angle of polarization.

12. A method comprising:
encoding data in an optical signal;
converting a seed to a target degree of polarization;
polarizing the optical signal, which includes the encoded data, to have the target degree of polarization;
transmitting the polarized optical signal
receiving the polarized optical signal;
measuring a degree of polarization of the received polarized optical signal;
converting a seed at a receiver to an expected degree of polarization;
determining that the received polarized optical signal is compromised based on a difference between the expected degree of polarization and the degree of polarization of the received polarized optical signal; and
re-routing communication, in response to the determination that the received polarized optical signal is compromised, to an optical fiber that is different than an optical fiber over which the polarized optical signal was received.

13. The method of claim 12, further comprising changing the seed in response to the determination that the received polarized optical signal is compromised.

14. The method of claim 12, further comprising ignoring the data encoded in the optical signal in response to the determination that the received polarized optical signal is compromised.

15. The method of claim 12, further comprising generating an intruder alert in response to the determination that the received polarized optical signal is compromised.

* * * * *